July 21, 1936.  W. WOELFLIN  2,047,989

METHOD FOR SEPARATING EMULSIONS

Filed Sept. 16, 1933   2 Sheets-Sheet 1

INVENTOR:
WILLIAM WOELFLIN,
By
ATTORNEY.

July 21, 1936.  W. WOELFLIN  2,047,989
METHOD FOR SEPARATING EMULSIONS
Filed Sept. 16, 1933   2 Sheets-Sheet 2
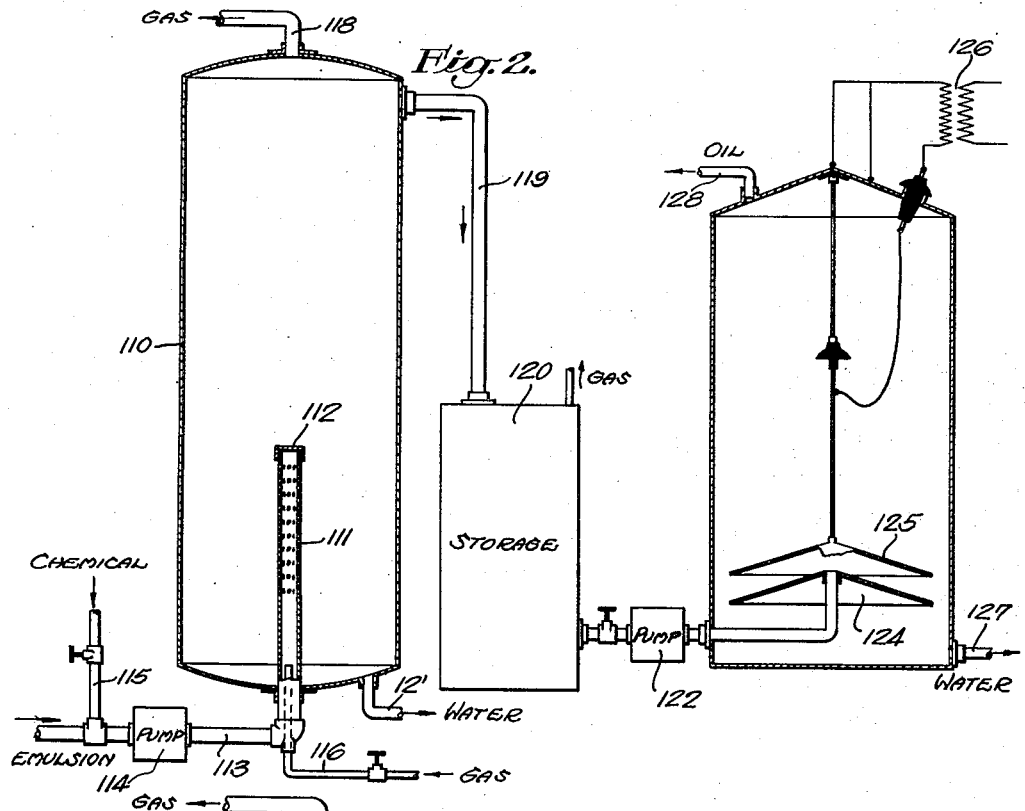
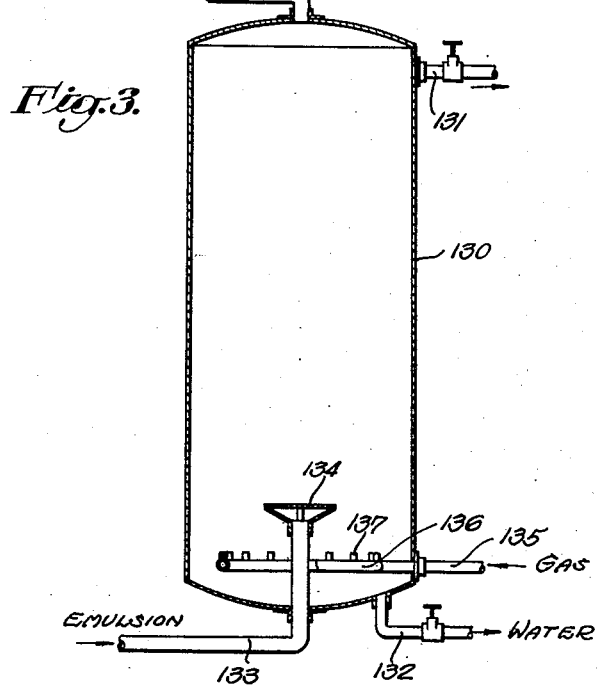
INVENTOR:
WILLIAM WOELFLIN,
By
ATTORNEY.

Patented July 21, 1936

2,047,989

UNITED STATES PATENT OFFICE 2,047,989

METHOD FOR SEPARATING EMULSIONS

William Woelflin, Long Beach, Calif., assignor to Petroleum Rectifying Company of California, Los Angeles, Calif., a corporation of California Application September 16, 1933, Serial No. 689,747

7 Claims. (Cl. 210—47)

My invention relates to a method for treating emulsions, and in the preferred embodiment the invention finds particular applicability in the art of separating oil from the ballast water of a ship though it is also applicable to other emulsions.

After the fuel-oil contained in the storage tanks of an oil-burning vessel is consumed, it is customary to pump sea water into these tanks for ballast purposes. The rolling of the ship churns up the sea water and the residual fuel-oil remaining in the bottom and sides of the tanks, thus forming an emulsion. Before a ship comes into harbor to take on fuel-oil, as much of the ballast water as possible is discharged into the ocean, but it is usually necessary to carry some ballast water in at least a portion of the fuel tanks when entering the harbor. Governmental regulations prohibit the discharge of such an emulsion into harbor waters unless the oil content thereof is extremely small, the present requirement being that the water contain less than seventeen parts of oil per million of water.

Certain of these emulsions do not readily separate and various forms of separators of the gravity type have been developed. However, no satisfactory and efficient separator is available for fuel-oils ranging in gravity from 6.5° A. P. I. to 15° A. P. I., the scale "A. P. I." being that adopted as standard by the American Petroleum Institute. On this scale sea water has a gravity of 6.5° A. P. I. It is an object of the present invention to provide a novel method and apparatus for very successfully treating such emulsions, though it should be made clear that the process operates very satisfactorily on other emulsions, regardless of the gravity range and regardless of whether this emulsion takes the form of ballast water or other natural or artificial emulsions.

The invention comprehends the introduction of gas into the emulsion, the gas moving therethrough and becoming associated with one phase of the emulsion, thus acting to move this phase toward one end of the chamber from which it can be removed, the other phase flowing into or remaining in the other end of the chamber so that it can be drawn therefrom. So also the invention in its preferred embodiment comprehends the separation of the gas in the chamber so that it can be separately withdrawn therefrom.

It will be understood that the ballast water is in reality an emulsion of the oil-in-water type. When a gas is bubbled through this emulsion it has been found that the gas becomes associated with the oil droplets, carrying these oil droplets into the upper part of the chamber. With certain types of emulsions undergoing treatment, the separation is relatively complete. With other types of emulsions, however, it has been found that the phase which becomes associated with the gas does not separate in the form of a substantially homogeneous liquid, but is rather in the form of an emulsion. The present invention comprehends removal of any such emulsions and separation of the phases thereof by any suitable means such as heat and gravity settling, chemical, electrical, or centrifugal means. The separated water is discarded and the separated oil can be re-used as fuel-oil.

It has been found that the throughput of a separator utilizing these principles is sometimes materially increased by the use of a suitable chemical treating agent of the type capable of resolving the emulsion formed by the ballast water or other material being treated, and one form of the invention comprehends the use of such a chemical de-emulsifying agent. It is preferable to use a chemical which changes the interfacial relationships.

These and other objects of the invention will be apparent to those skilled in the art from the following description.

The drawings illustrate rather diagrammatically several forms of apparatus suitable for carrying out the process, but it should be understood that this showing is only for illustrative purposes and not for the purpose of limiting myself to the particular form shown.

Referring to these drawings:

Figs. 2 and 3 illustrate alternative forms of apparatus suitable for carrying out the process.

Figure 1:
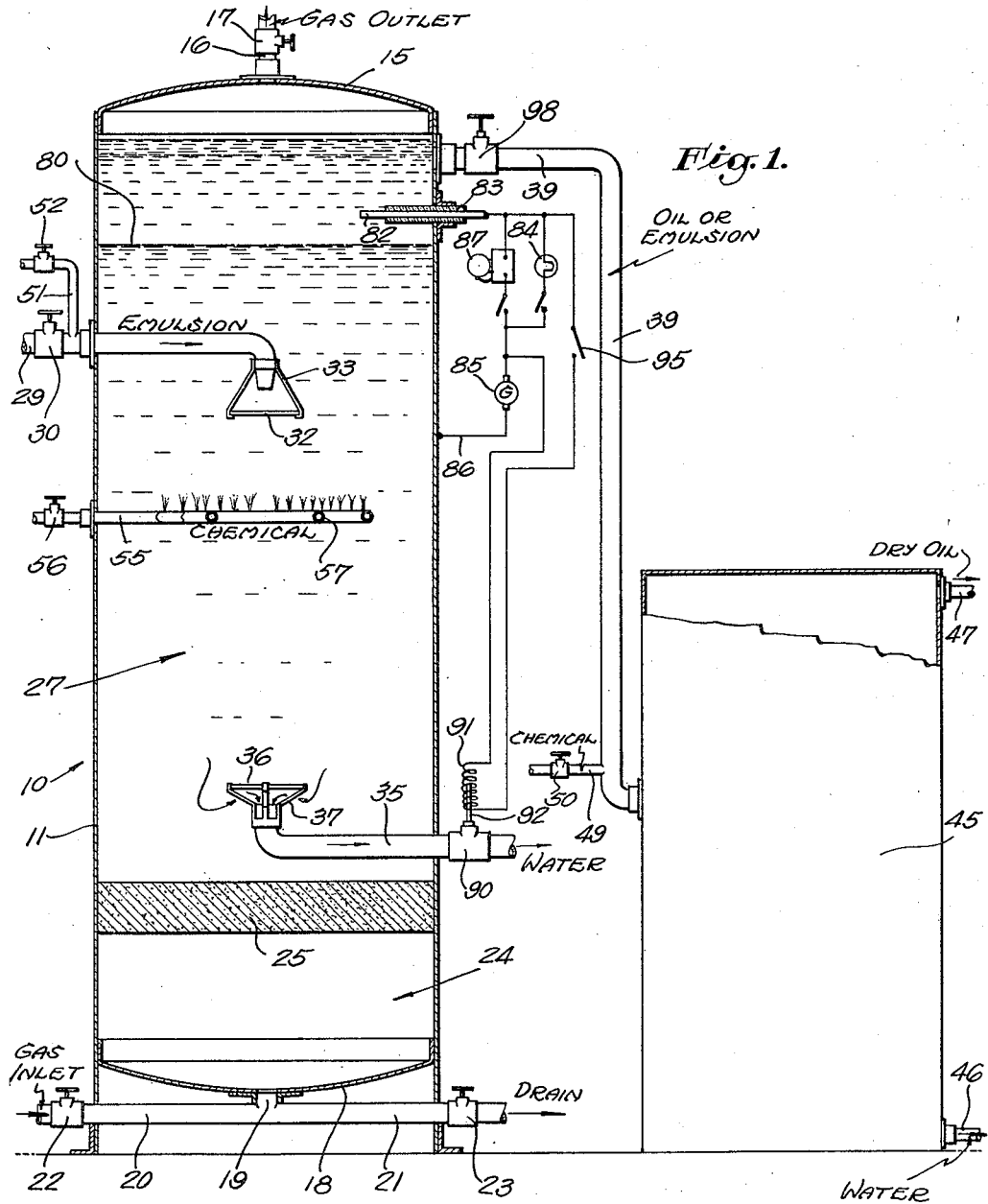
Fig. 1 illustrates one form of apparatus which has proved very satisfactory.

In the embodiment illustrated I utilize a separator 10 including a shell 11 which is preferably, though not invariably, mounted in an upright position, the longitudinal dimension of this shell being shown as being greater than the transverse dimension. When used on board ship, space considerations usually prohibit a shell of a height of more than 8' to 10', but such a shell is entirely satisfactory in carrying out the process. The diameter of this shell will depend upon the capacity desired.

The upper end of the shell is enclosed by a head 15 which may carry a gas outlet 16 provided with a suitable valve 17. Similarly, the lower end of this shell 11 is closed by a head 18 which may carry a pipe 19 connected both to a gas inlet pipe 20 and to a drain pipe 21, these pipes respectively including valves 22 and 23. The valve 23 is normally closed except when liquid is being drained from the shell.

Gas is supplied through the pipe 20 to the lower end of the shell. Any suitable means may be used for distributing this gas in the shell, but in the embodiment shown in Fig. 1 I find it preferable to use a porous member 25 which may conveniently be positioned near the bottom of the shell 11, being retained in fixed position by means not shown. The space in the enclosure below the porous member 25 thus comprises a gas chamber 24 which is filled with gas, this gas moving upward through the porous member 25 and into a separating chamber 27 defined in the enclosing structure above the porous member 25.

The emulsion to be treated, such as the ballast water previously described, is introduced into the separating chamber 27 through a pipe 29 carrying a valve 30. Best results are obtained with this form of apparatus if this emulsion is introduced in the upper portion of the separating chamber so that a counterflow of the emulsion and the gas takes place. The emulsion may be introduced through pipes or any other suitable means. In the preferred form the emulsion is introduced in a downward direction. The form illustrated includes a pipe 29 which is bent downward, and I have sometimes found it desirable to use a splash plate 32 against which the incoming emulsion is forced, this plate very effectively distributing the incoming emulsion. However, this plate can be dispensed with. If used, the plate may be mounted by any suitable means such as brackets 33 connected to the pipe 29. It will thus be clear that the intermediate portion of the separating chamber 27 is filled with the emulsion which is to undergo treatment, and that the gas will be distributed equally by the porous member 25 and will bubble upward through the emulsion. Thus, it becomes possible to use a counter-flow of gas and emulsion, this feature being often desirable. In the preferred embodiment I separate the gas in the upper portion of the separating chamber 27, though this is not always essential to the invention.

It has been found that the gas moving upward through the emulsion tends to become associated with the oil droplets therein, carrying these oil droplets upward therewith and into the upper portion of the separating chamber 27. The rising gas bubbles thus have the effect of sweeping the oil droplets from the water thus leaving substantially clean water in the lower portion of the separating chamber 27 whence it can be withdrawn through a pipe 35 preferably provided with a plate 36 carried as by brackets 37. On the other hand, the material which is carried upward by the gas is collected in the upper end of the separating chamber and may be withdrawn through a pipe 39. When certain emulsions are being treated the material thus withdrawn through the pipe 39 will be substantially a water free oil. When other emulsions are being treated, this material will be in the form of a water-in-oil emulsion. Thus, while the original emulsion entering the separating chamber is of the oil-in-water type, the emulsion withdrawn from the upper end of the separating chamber is in the main of the water-in-oil type. In some instances the water content of the latter type is extremely small and does not prevent this oil from being used for commercial purposes. In other instances, however, the water content is undesirably high. Thus, on board ship it is desirable to be able to separate substantially dry oil so that it can be subsequently burned in the boilers or other drive equipment. If this is the case, it is sometimes desirable to use auxiliary means for separating the phases of the newly formed emulsion.

In the drawings I have illustrated such an auxiliary means as comprising a settling tank 45, the emulsion being introduced into the central portion thereof by any suitable means not shown. With some types of emulsion the gravitational action itself will suffice to separate the phases of this newly formed emulsion, permitting the water to be withdrawn through a pipe 46 and the oil to be withdrawn through a pipe 47. The action is, however, greatly accelerated by the use of a suitable chemical de-emulsifying agent which may be introduced directly into the settling tank 45 or into the pipe 39 through a pipe 49 controlled by a valve 50. This chemical may be of any suitable type capable of breaking an emulsion which is substantially of the water-in-oil type, as will be hereinafter described. However, it should be clear that other types of separator can be used in this capacity. Thus, the pipe 39 may communicate with the intake of an electrical dehydrator of the well-known type, such as shown in Fig. 2, including a pair of electrodes between which an electric field is impressed. In other instances it is possible to subject the emulsion flowing through the pipe 39 to the action of a suitable centrifuge.

With most types of incoming emulsions the action in the separating chamber 27 is increased manyfold by the use of a chemical agent capable of treating an emulsion of the oil-in-water type. Such a chemical may be introduced into the stream of emulsion flowing through the pipe 29 by a pipe 51 controlled by a valve 52. In other instances the chemical can be introduced directly into an intermediate portion of the separating chamber 27 as by a pipe 55 including a valve 56. A spray means 57 which may be in the form of concentric pipes with upwardly directed perforations may be used to facilitate the introduction of the chemical.

This chemical de-emulsifying agent is preferably one which modifies the interfacial characteristics of the emulsion. Those chemicals which change the interfacial tension seem to be very satisfactory. Thus, a water-soluble de-emulsifying agent may be used, preferably one which reacts with the calcium and magnesium in the water to form an oil-soluble calcium or magnesium soap which is colloidally dispersed in the water, in which case the action of the calcium or magnesium soap aids the coagulation or separation of the finely divided oil particles. However, various types of chemical de-emulsifying agents suitable for this purpose are known in the art. For instance, certain of the metallic sulphates such as described in the patent to Barnickel, No. 1,093,098, may be used. Also certain of the water-softening agents may be used, as set forth in the patent to Barnickel, No. 1,223,659, or modified fatty acids are applicable, as set forth in the Barnickel patent, No. 1,467,831. A modified organic soap-forming material is described in the patent to DeGroote, et al., No. 1,595,457, and this material can also be used to advantage. Highly colloidal, coaguescent suspensions, containing a soap-forming organic radical may also be used, as described in the patent to DeGroote, No. 1,596,593. So also, a water-soluble salt of a sulphuric acid can be used, as described in the patent to Rogers, No. 1,299,385. A reagent capable of forming, by reaction in the continuous phase, a substance in a state of colloidal dispersion therein, and which will act as an emulsifying colloid tending to reverse the form of the emulsion can also be used. Such a material is set forth, for instance, in the patent to Ayres, Jr., No. 1,570,987. In addition, polyvalent water-soluble metallic salts such as $CaCl_2$ or $FeCl_3$, or water or oil-soluble soaps of fatty acids, as oleic acid or stearic acid, may be used, as well as any other de-emulsifying agent suitable for the separation of water and oil emulsions.

The above chemicals with the exception of $CaCl_2$ and $FeCl_3$ can be advantageously used in separating any emulsion reaching the settling tank 45, these chemicals being then introduced through the pipe 49. In other instances, however, the water content may be insufficient to make it desirable to separate this emulsion, in which event the settling tank 45 can be dispensed with.

Returning to the function of such chemical treating agents when supplied to the separating chamber 27, the action of the chemical agent is one of adsorption of the colloidally dispersed calcium or magnesium soap at the oil-water interface. This adsorption alters the interfacial characteristics in a manner which allows the adherence of a bubble of gas. This gas thus tends to carry the oil droplets upward in the chamber 27. However, the chemical has another desirable action; namely, that of altering the interfacial forces so that coalescence of the dispersed oil droplets is facilitated as they reach the upper end of this chamber. The use of soap-forming chemicals in conjunction with the rising gas appears particularly desirable in that it forms bubbles in the chamber 27, each bubble being formed by a particle of gas surrounded by the soap-like film. Careful observation shows the presence of minute oil droplets in these soap-like films. Often the surface of the liquid in the chamber 27 presents a froth-like appearance, and as the bubbles break the gas is liberated and the oil droplets coalesce. Usually this separation of the gas can conveniently take place in the upper end of the chamber 27, but if desired it is possible to remove this foam or froth prior to the time that all of the gas is liberated, allowing the material to stand until this gas is released. Only a short interval of time is necessary for this gas to be completely released.

The chemicals may be added while either in a wet or dry state. The proportion of chemical used varies with the material undergoing treatment as well as the particular chemical utilized. Usually, however, only a very small amount of chemical is desirable. It has often been found, for instance, that when treating ballast water a ratio of 1 part of chemical to 8,000 parts of ballast water is very satisfactory. However, the ratio may be varied over wide limits, the figure being merely illustrative.

So also, while it is ordinarily unnecessary to apply heat to the chamber 27, this additional step of heating can be utilized and facilitates the action on certain types of emulsions undergoing treatment.

The gas utilized may be air or other gas, air being found to be very satisfactory. The proportion of air and water utilized is not critical. Three volumes of air to one of water will ordinarily give very satisfactory results, though best results are obtained between the limits of three to six volumes of air for one volume of water. The process is not, however, limited to these values, for satisfactory treatment can be obtained even below or beyond these limits, these limits being set forth only as illustrative.

The separator may be either of the open or closed type, for in some instances the head 15 can be entirely dispensed with. So also, it may be operated at atmospheric pressure or at pressures above atmospheric. In the latter instances, suitable valves are provided in the outlet pipes and suitable pumps are installed on the pipes supplying gas and ballast water or other emulsion to the separating chamber, as well as on the chemical-delivery pipe.

It is usually desirable to maintain the water level in the separating chamber at a position indicated approximately by the dotted line 80. It is sometimes preferable to utilize an apparatus which will indicate to the operator the position of this level, and in some instances actually control this level automatically. In the form of the invention shown in Fig. 1 such a means is illustrated as being in the form of an electrode 82 supported in a bushing 83 and extending into the separating chamber 27 adjacent the desired position of the level 80. This electrode may be connected in series with a lamp 84 and a generator or other potential supply means 85, the circuit being completed through a conductor 86 connected to the shell 11. Thus, when the water level 80 reaches a point opposite the electrode 82 current will flow from the generator through the conductor 86, the body of water in the tank, the electrode 82, and the lamp 84, thus indicating to the operator that the water level is adjacent the position of the electrode. If desired an electric bell or other audible signal 87 may be connected in parallel with the lamp 84 as shown. Switches may be provided in series with the lamp 84 and the bell 87 to respectively eliminate these appliances from the circuit, if desired.

The apparatus shown in Fig. 1 also includes an automatic means for maintaining the level. The form shown includes a valve 90 in the pipe 35, this valve being normally controlled by a solenoid winding 91 acting on the plunger 92. When this plunger is pulled upward by the energization of the solenoid, the valve 90 opens. If desired a suitable stop means may be provided so that the valve is never completely closed, the energization of the solenoid merely acting to increase the flow through the valve. This solenoid 91 is connected in parallel with the lamp 84, as shown, and a switch 95 makes it possible to use or eliminate the automatic action as desired. It will be clear that when the water level 80 rises to such an extent that the water contacts the electrode 82 current will flow through the solenoid 91 to further open the valve 90, thus increasing the water drainage, and thus tending to lower the water level 80. A valve 98 is positioned in the pipe 39 and may also be used in conjunction with the automatic control system if desired.

In Fig. 2 I have illustrated an alternative form of apparatus including a tank 110 in which the water is separated. In this form of the invention a perforated thimble 111 extends upward in the tank and is closed at its upper end by a cap 112. The emulsion to be treated is supplied thereto through a pipe 113. If desired a pump 114 may be utilized for this purpose, in which event it is possible to introduce the chemical, if desired, through a pipe 115 communicating with the intake of the pump. The pump thus acts to mix the chemical and the emulsion and move the resulting material upward in the thimble 111 so that it is discharged through the perforations thereof.

In addition, the lower end of the thimble 111 communicates with a gas-supply pipe 116 which supplies gas thereto. In this form of the invention the gas and the emulsion, as well as the chemical, if desired, are discharged into the tank 110 through the same means. An intimate contact between the chemical and the emulsion is thus effected not only in the pump but in the thimble 111. So also the gas comes into intimate contact with the liquid both while it is rising in the thimble 111 and as it is moving through the perforations thereof. Thereafter the gas of course rises to the upper end of the tank 110 and can be withdrawn through the pipe 118, if desired. In other instances it is possible to remove the gas with the oil or emulsion which gathers in the upper end of the tank, this being done through a pipe 119 which preferably communicates with a storage tank 120. The water can be withdrawn through a pipe 12' communicating with the lower end of the tank.

At intervals, or continuously if desired, the material in the storage tank 120 can be withdrawn through a pump 122 and delivered to a treating space between electrodes 124 and 125 of a conventional electric dehydrator. This dehydrator may be of the type shown in the patent to H. C. Eddy, No. 1,544,528, and is diagrammatically shown in Fig. 2. An electric field is set up between the electrodes 124 and 125 by the use of a transformer 126, and the action of this field tends to coalesce the dispersed particles of the emulsion so that separation can take place in the dehydrator tank. The water may be withdrawn through a pipe 127 and the oil through a pipe 128. Other types of separators may be used in this capacity.

The form of the invention shown in Fig. 2 does not provide a counter-flow of emulsion and gas. It is effective, however, in distributing the gas and allowing this gas to rise through the emulsion in the central portion of the tank 110.

In the form of the invention shown in Fig. 3 still a different introduction means is illustrated. Here a tank 130 is utilized, the oil or emulsion being withdrawn through a pipe 131 and the water being withdrawn through a pipe 132. The incoming emulsion moves through a pipe 133 which extends upward in the tank. A baffle 134 is preferably disposed above the end of this pipe so as to spread the incoming emulsion outward. In this form of the invention the gas is introduced through a pipe 135 communicating with a pipe 136 which may provide suitable openings. In the preferred embodiment these openings may communicate with nipples or nozzles 137 which draw the gas upward so that the gas particles become associated with the oil as previously set forth.

In general, it should be clear that while the process finds particular utility in treating ballast water, it is not limited thereto. Other emulsions, usually of the oil-in-water type, can be very satisfactorily treated. Thus, the process can be used in separating lubricating oil from condensed steam, and in recovering various other oils from a water environment.

The process appears to be particularly valuable in removing oil particles from ballast water, and particularly those emulsions in which the continuous phase is sea-water. Fresh water emulsions are sometimes more difficult of treatment. It is often desirable to add thereto either a calcium or magnesium salt prior to or during the time that the emulsion is in the treating chamber.

It should be understood that the invention is not limited in utility to use with a chemical de-emulsifying agent. Thus, it is entirely possible to successfully treat the ballast water or other emulsion even when no chemical is supplied thereto. The addition of the chemical, however, appears to materially increase the throughput of the unit.

Nor am I limited to the form of apparatus shown, though this form has been found to give very satisfactory results. Thus, while the porous member 25 has been found very satisfactory in distributing the incoming gas, other means may be utilized in this capacity. Further, while I have shown a closed system it should be understood that the invention does not depend for novelty or utility upon this feature.

Further, while I have shown the invention as applied to a continuous process it should be clear that this is not essential. A batch process may be used with entire success. However, if a continuous process is used, the counter-flow system shown is particularly desirable for the ballast water in flowing downward through the separating chamber comes into intimate contact with the rising bubbles of gas.

Various other advantages and modifications will be apparent to those skilled in the art and fall within the scope of the appended claims.

I claim as my invention:

1. A method of treating oil-contaminated ballast water, said ballast water including oil droplets suspended therein, and of a density closely approximating the density of the water, which method includes the steps of: subjecting said ballast water in its original state and without previous dilution of the oil droplets which might modify the relative densities of the oil and water to the action of a chemical de-emulsifying agent of the type adapted to break an oil-in-water type of emulsion; introducing gas into a chamber containing a body of said ballast water whereby said gas becomes associated with the oil droplets of said ballast water as modified by said chemical de-emulsifying agent; removing said gas and said oil from one end of said chamber; and removing the water from the other end of said chamber.

2. A method of treating oil-contaminated ballast water, said ballast water carrying droplets of oil of a density closely approximating the density of the water, which method includes the steps of: subjecting said ballast water in its original state and without previous dilution of the oil droplets which might modify the relative densities of the oil and water to the action of a chemical de-emulsifying agent of the type adapted to break an oil-in-water type of emulsion to modify the interfacial characteristics of said ballast water; bubbling a gas through said ballast water while positioned in a chamber whereby said gas becomes associated with the modified oil droplets to carry these oil droplets upward in said chamber to form a body of emulsion of the water-in-oil type in the upper end of said chamber, leaving the substantially pure water in the lower end of said chamber; removing said water from the lower end of said chamber; removing said gas from the upper end of said chamber;

treating said emulsion to agglomerate the water phase thereof; and separating said agglomerated water phase from the oil phase thereof.

3. A method of treating an emulsion of the oil-in-water type, which method includes the steps of: subjecting said emulsion in its original state and without previous change of the relative densities of the oil and water to the action of a chemical agent of the type capable of changing the interfacial tension of said emulsion; and bubbling a gas upward through the modified emulsion whereby said gas becomes associated with the oil droplets, sweeping these oil droplets upward and leaving a substantially clean body of water.

4. A method of treating an emulsion of the oil-in-water type, which method includes the steps of: continuously introducing into a chamber containing a body of said emulsion a chemical de-emulsifying agent capable of changing the interfacial tension of said emulsion; continuously introducing into said chamber a gas which moves through the treated emulsion to sweep upward the dispersed oil droplets leaving the purified water in the lower part of said chamber; retaining a body of auxiliary emulsion of oil and water in the upper part of said chamber, said gas moving said oil droplets upward to said body of auxiliary emulsion; and separately withdrawing said purified water and said auxiliary emulsion from said chamber.

5. A method of treating an emulsion of the oil-in-water type, which method includes the steps of: maintaining in a chamber a body of liquid; continuously introducing into a passage communicating with said chamber a stream of the emulsion; continuously introducing into said passage a small quantity of a chemical de-emulsifying agent capable of changing the interfacial tension of said emulsion but in such form and amount as to not materially dilute the oil to such an extent as to substantially alter the relative densities of the oil and water of the emulsion; bubbling a gas upward through said chamber whereby said gas becomes associated with the oil droplets in the chemically treated emulsion and moves these oil droplets upward to the upper end of said chamber; and withdrawing said gas, said water, and said oil from said chamber.

6. A method of treating an emulsion of the oil-in-water type, which method includes the steps of: maintaining in a chamber a body of liquid; continuously introducing into a passage communicating with said chamber a stream of the emulsion; continuously introducing into said passage a small quantity of a chemical de-emulsifying agent capable of changing the interfacial tension of said emulsion but in such form and amount as to not materially dilute the oil to such an extent as to substantially alter the relative densities of the oil and water of the emulsion; continuously introducing a gas into said passage whereby upon discharge from said passage of said emulsion said chemical de-emulsifying agent and said gas said gas bubbles upward through the liquid in said chamber and becomes associated with the oil droplets in the chemically treated emulsion and moves these oil droplets upward to the upper end of said chamber; and withdrawing said gas, said water, and said oil from said chamber.

7. A method of treating ballast water drawn from tanks of ships and comprising an emulsion the continuous phase of which is sea water and the dispersed phase of which is fuel oil of gravity from 6.5° A. P. I. to 15° A. P. I., which method includes the steps of: withdrawing said ballast water from said tanks; adding to said ballast water while in its original state and while the gravity of said oil phase is from 6.5° A. P. I. to 15° A. P. I. a small quantity of a chemical de-emulsifying agent capable of modifying the interfacial tension of said ballast water emulsion but in insufficient quantity to materially change the relative densities of said water and oil; maintaining a body of auxiliary emulsion of oil and water above the chemically treated ballast water emulsion; floating the oil particles of said ballast water emulsion upward to said body of auxiliary emulsion by bubbling gas through said ballast water emulsion; and separately removing said auxiliary emulsion and the water from which said oil particles have been removed.

WILLIAM WOELFLIN.